May 11, 1954      D. L. KEISER      2,678,007
ELECTRIC LOCOMOTIVE
Filed Dec. 23, 1948      2 Sheets-Sheet 1
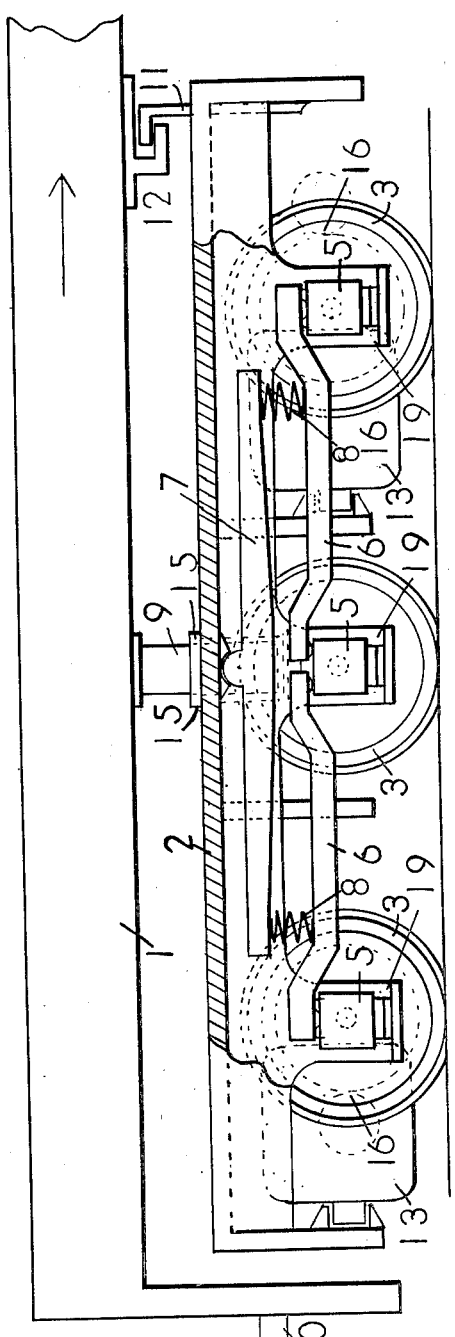
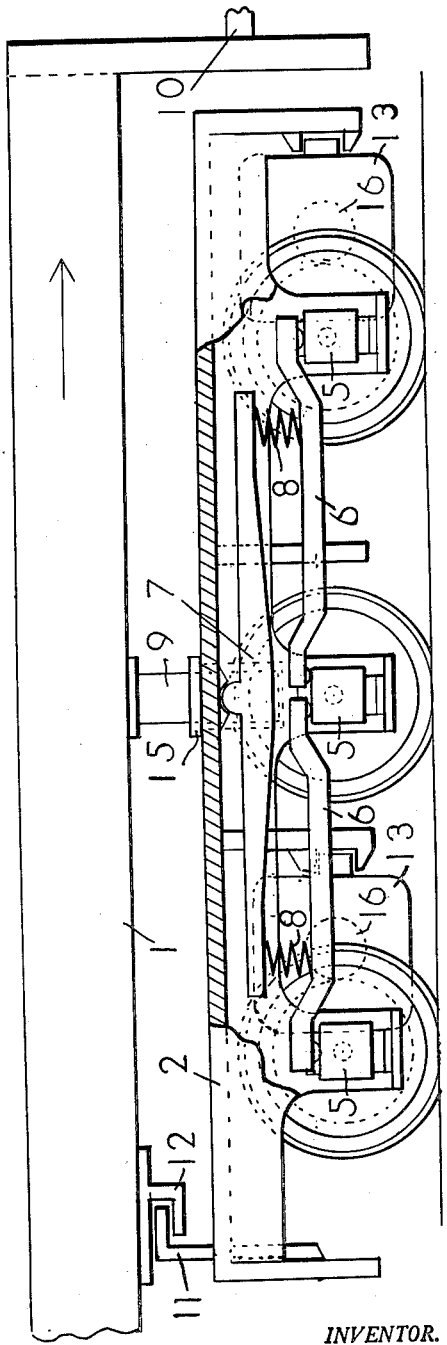
INVENTOR.
BY David L. Keiser May 11, 1954     D. L. KEISER     2,678,007
ELECTRIC LOCOMOTIVE
Filed Dec. 23, 1948     2 Sheets-Sheet 2
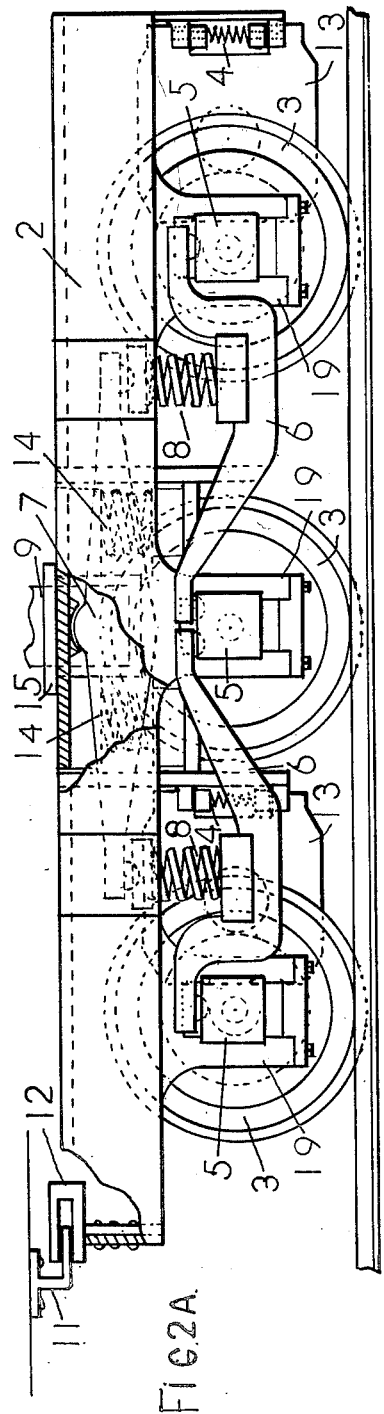
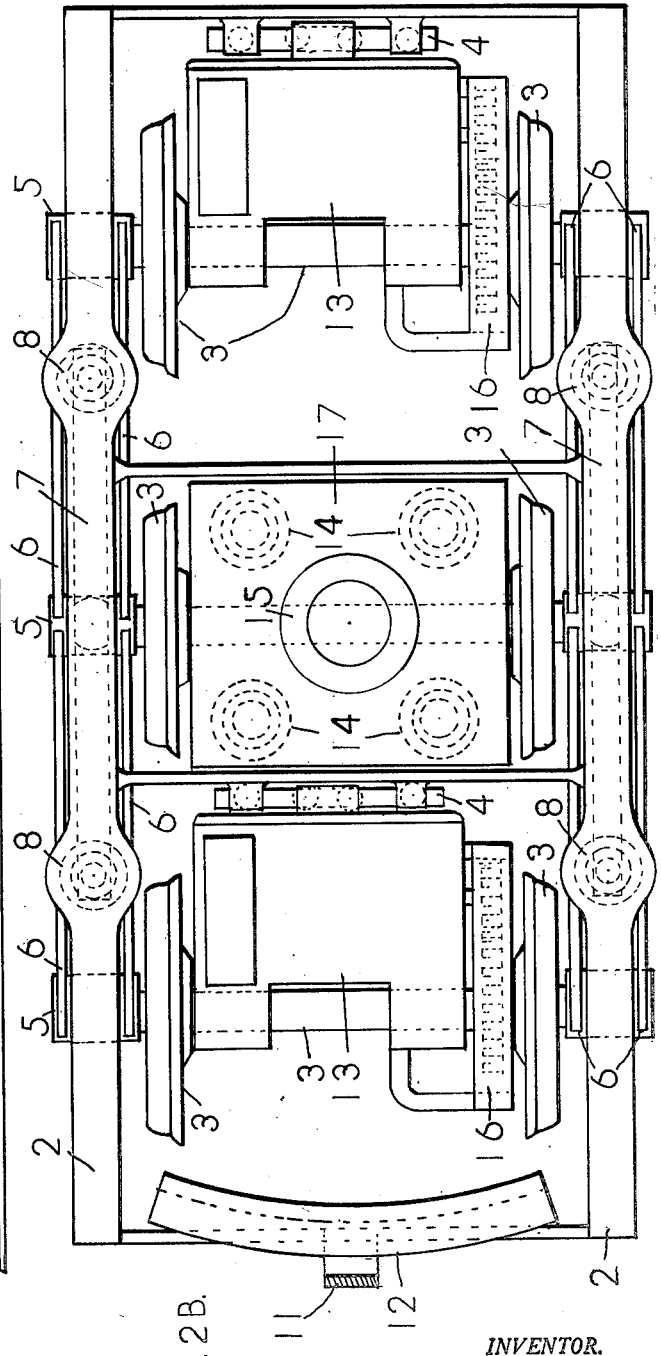
Fig. 2A.
Fig. 2B.
INVENTOR.
BY David L. Keiser

UNITED STATES PATENT OFFICE 2,678,007

ELECTRIC LOCOMOTIVE

David L. Keiser, San Antonio, Tex.

Application December 23, 1948, Serial No. 66,931

3 Claims. (Cl. 105—49)

This invention relates to a novel improvement in a railway locomotive, either straight electric or diesel electric of the type in which a cab frame containing the two draw bars is mounted upon two swivel acting trucks, each truck having three wheeled axles, the intermediate axle being the idle one, and the other two equipped with universal axle hung traction motors.

The objects of this invention are (1) to prevent the weight transfer which normally takes place in a locomotive due to heavy tractive effort from reducing the weight upon any of the driven axles, and transferring it to, or between, any of the other driven axles under all conditions of load, and (2) to maintain equal distribution of dead or live weight upon the supporting springs of each truck under all operating conditions, including poorly maintained track or road-way, all of which are accomplished by novel arrangements, combinations, constructions, improvements, and added parts.

The accompanying drawings, referred to herein and constituting a part hereof, illustrate an embodiment of the invention, and together with the detailed description, serve to explain the principle of the invention.

In the drawings:

Figures 2A and 2B are somewhat diagrammatic side and plan view of the present and illustrative embodiment of the invention. Figures 1A and 1B are somewhat schematic side views in elevation of a typical locomotive with the bed frame broken away between the two trucks for convenience of illustration, the trucks being the same as those shown in Figures 2A and 2B with the exception that they are shown in schematic form.

The locomotive cab or main frame may be of any desired length or construction and is shown schematically as a bed frame member 1 equipped with standard draft gearing, or draw bars 10, one connected to each end of frame.

The bed frame 1 in the form shown may provide a space of any desired length between the front and rear king pins 9 by which the trucks are pivoted to support the main frame of the locomotive for swiveling about a vertical axis. The truck frame 2 is adapted to be carried by three separate wheeled axle assemblies 3, the axles being rotatably journaled in the usual journal box 5 at either side of the frame, the boxes being mounted for vertical movement relatively to the frame in the downwardly extending guide-way portion 19 forming a part of the frame.

Upwardly extending from the truck frame 2 is a king pin 9 rigid with respect to the cab frame 1 and seated within a conventional socket built into the spring mounted bolster 17, while relative movement between truck frame 2 and locomotive bed frame 1, except about axis of king pin 9, is substantially prevented by means of lug 11 mounted on one end of the truck frame 2 and running in the channel of bolster 12 fixed to the underside of bed frame 1, the first and third wheeled axle assemblies 3 being driven by standard axle hung traction motors 13, while the second wheeled axle 3 is in all cases the intermediate and idle axle. In order to introduce the use of lug 11 and bolster 12 for maintaining horizontal relation between truck and cab frames, a special equalizer 7 is installed in between the side walls of the side frame of the truck pivoted on the under-side of frame 2 substantially over the center of the intermediate journal box 5. Heavy helical compression springs 8 are provided between the ends of equalizer bar 7 at a point on the distributing bar 6 one third the distance from the driven axle to the idle axle. The point of support of the springs 8 on their respective bars 6 is such that the load transmitted by each of the springs is distributed two thirds to one of the driving axle assemblies 3 and one third by each of the bars 6 to the idle axle 3, thereby equalizing the load on the three sets of axles.

Figures 1A and 1B show the king pin 9 as being seated in a socket 15 placed in the truck frame proper, whereas Figures 2A and 2B show it as being placed in a spring mounted bolster 17. Where lug 11, bolster 12 and equalizer 7 are employed the king pin may be seated in the socket placed in the truck frame, or it may be seated in a socket placed in the spring mounted bolster, as the truck frame is no longer expected to equalize the dead or live load between the supporting springs, and now becomes a part of the cab frame structure.

Figures 2A and 2B of the drawings show a preferred form of the three axle truck having two sets of driving axles, and substantially in accordance with the schematic form shown in Figures 1A and 1B of the drawings except for the fact that both sides of the truck frame are shown in Figure 2B. This truck may be either the forward, or the rear truck of the locomotive and considering the relation of the motors to the driving axles, it would be a view taken from the right of the forward truck, or from the left of the rear truck. In this drawing the motors 13 are shown geared to their axles by gear and pinion 16 enclosed in a gear case, and also by axle bearings, the supporting nose of the motors being attached to the frame cross members through a spring arrangement 4 whereas in Figures 1A and 1B it is shown attached direct to the frame cross member. The bolster is shown mounted upon helical springs 14 whereas elliptic springs are also used.

Lug 11 is shown in Figures 2A and 2B as being mounted upon the cab frame, while Figures 1A and 1B show it mounted upon the truck frame end. Either of the above mentioned arrangements may be used in the improved locomotive without in any way interfering with its performance as claimed in this invention.

In this locomotive herein referred to, and with the improvements, the motors are universally positioned with the leading motor to the rear of its axle and, the trailing motor to the front of its axle, and the truck frame 2 resting upon the supporting springs 8, where the king pin is loose fitting and provided with a horizontal axis, permitting of free vertical movement of truck ends, the truck frame distributes the dead weight of the locomotive between the two supporting springs. Where the king pin is tight fitting in the socket, and having a flat bottom, the truck frame fails to distribute equally the dead weight between the supporting springs.

In a truck frame, fitted with loose fitting king pin and resting upon the supporting springs, the motor reaction in a vertical direction upon the frame and axle, together with the motor torque, or tractive effort, forcing the journal box horizontally against the truck frame, at axle height, and the truck frame in turn, and at its top-most point, being forced in opposite horizontal direction by the king pin, the transfer of weight is found to be quite excessive, some eight or ten thousand pounds. Referring now to Figures 1A and 1B, there is shown a typical and illustrative embodiment of the invention as applied to this same three axled truck locomotive, the traction motors being placed ahead of their respective axles on the front truck and to the rear of their axles on the rear truck, which permits operation in either direction with equal results. The new and added equalizer 7 through its free acting pivot, supporting the truck and cab frames equally, distributes both dead and live weight between the supporting springs under all conditions of track, with either tight or loose fitting king pin and bolster. The added arcuate journal consisting of lug 11 and bolster 12 maintains horizontal relation between truck and cab frames at all times.

With the two truck frames and the cab frame tied together through the arcuate journal and the center bearing, the three form a single piece cab frame structure, the motor nose being supported by this single piece frame, and above the equalizer, transfers the motor nose reaction from the equalizer to the cab frame, where it reduces the weight upon the front truck, and increases it upon the rear truck. The truck frame pressure against the king pin is also replaced by the draw bar action upon the cab frame structure, the two changes cause an entirely different transfer of weight from that of the original, unimproved locomotive.

Referring now to the action of the improved locomotive, taking first the rear truck, for illustration, the motor nose action being vertically downward upon the combined truck and cab frame, and as shown by the drawings, above the equalizing system and the resultant action of the two motors, being at a point well to the rear of the rear king pin, or the equalizing center, using the cab frame as a lever, the king pin as a fulcrum, the weight upon the front truck is reduced and upon the rear one is increased, distributing the load equally between the supporting springs. This increased load upon the supporting springs of the rear truck is opposed by the motor reaction upon the axle between the wheels, through the bearings and gearing, being in the same amount as the nose action but in the opposite direction. The vertical action upward of the motor upon the axle, supporting the short end of the transfer bar carrying the spring, resists the live load put upon the spring due to the motor nose action, using the transfer bar as a lever, the spring position as the fulcrum, the idle axle as a support for the long end of the lever, the required vertical action of the axle being two thirds of the imposed load upon the spring, with the other one third increasing the weight upon the idle axle, and the remainder of the motor action upon the axle as a net reduction in weight.

Due to this motor reaction, the weight gained by the idle axle being somewhat greater than the combined loss of the two motored axles is accounted for by the reduction in weight of the front truck, leaving the total weight of the locomotive unchanged.

The motor action upon the front truck and cab being the same as that of the rear truck but in the opposite direction, transfers load from the idle axle to the two motored axles.

Assuming the draw bar position to be the same as that of the motored axles, the same distance above the rails, it would be in the neutral position, neither assisting nor opposing the action of the four motors, but since the draw bar position is fixed by law, it is some distance above the motored axles, where its action, caused by the tractive effort of the four motors, transfers additional weight from the front truck to the rear truck, and in equal amounts, from and to the several axles. In the locomotive in question, this draw bar action is just sufficient to remove the weight gained by the two front motored axles, and restore the weight lost by the two rear motored axles, leaving the four motored axles unchanged in weight, all of the transfer being from the front idle axle to the rear idle axle and, leaving the total weight of the locomotive undisturbed.

The invention in its broader aspects is not limited to the specific mechanism shown and described but departures may be made therefrom within the scope of the accompanying claims without departing from the principles of the invention and without sacrificing its chief advantages.

What is claimed is:

1. In a railway locomotive, the combination of a truck frame, three wheeled axles mounted in said frame, vertical pivot means for connecting the truck frame to a locomotive frame, mechanical means, consisting of an arcuate journal, or plate, attached to the underside of the locomotive frame and arranged to receive, between its jaws, the tongue of a bolster attached to either of the end cross members of the truck frame, for maintaining horizontal relation between truck and cab frames, individual motors drivingly connected to two of said axles and individually supported from the truck frame adjacent one end of the truck relative to their respective driven axles, the intermediate axle being an idle axle, a lever pivoted to the truck frame intermediate the driven axles, a pair of levers interconnecting each driven axle with the intermediate axle, said first lever being resiliently connected at its ends to an intermediate point of each of said pair of levers, for transferring load from the truck frame to all of said axles and from either driving axle to the other two axles, and permitting independent movement of all of the axles relative to each other and to the frame.

2. A railway locomotive having front and rear driving trucks, pivotally connected to the locomotive frame in which each of said trucks is in accordance with claim 1.

3. In a railway locomotive, the combination of a truck frame, three wheeled axles mounted in said frame, vertical pivot means for connecting the truck frame to a locomotive frame, mechanical means, consisting of an arcuate journal, or plate, attached to the underside of the locomotive frame and arranged to receive, between its jaws, the tongue of a bolster attached to either of the end cross members of the truck frame, for maintaining horizontal relation between truck and cab frames, individual motors drivingly connected to two of said axles and individually supported from the truck frame adjacent one end of the truck relative to their respective driven axles, the intermediate axle being an idle axle, a lever pivoted to the truck frame intermediate the driven axles, a pair of levers interconnecting each driven axle with the intermediate axle, said first lever being resiliently connected at its ends to each of said pair of levers, such connection being made at about one-third the distance from the driven to the idle axle and closer to the driven axle for transferring load from the truck frame to all of said axles and from either driving axle to the other two axles, and permitting independent movement of all of the axles relative to each other and to the frame.

References Cited in the file of this patent

UNITED STATES PATENTS

| Number | Name | Date |
|---|---|---|
| 149,693 | Thompson | Apr. 14, 1874 |
| 907,822 | Larson | Dec. 29, 1908 |
| 1,584,135 | Pflager | May 11, 1926 |
| 1,895,500 | Todd | Jan. 31, 1933 |
| 1,922,896 | Lipetz | Aug. 15, 1933 |
| 2,126,668 | Ruth | Aug. 9, 1938 |
| 2,385,642 | Peterson | Sept. 25, 1945 |

FOREIGN PATENTS

| Number | Country | Date |
|---|---|---|
| 557,046 | France | Aug. 1, 1923 |
| 261,800 | Great Britain | June 23, 1927 |